P. F. SPERY.
LIGHT VARYING APPARATUS FOR PRINTING MECHANISMS.
APPLICATION FILED MAY 21, 1914.

1,232,727.

Patented July 10, 1917.
4 SHEETS—SHEET 1.

Witnesses.
R. Burkhardt
C. H. Roemer

Inventor.
Philemon F. Spery
By Luther Johns, Atty.

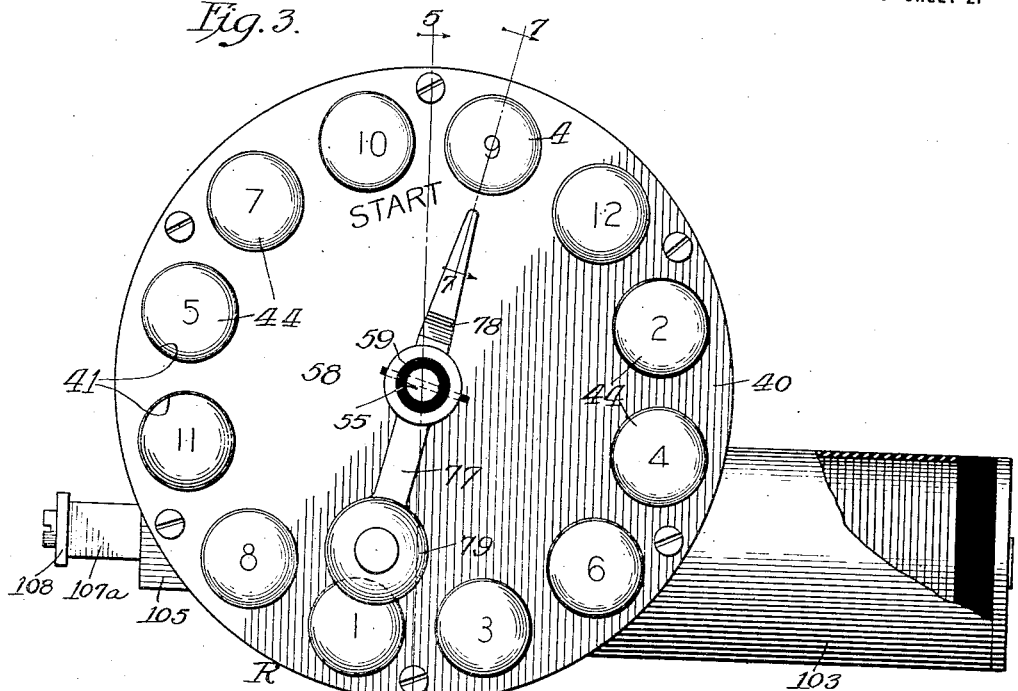
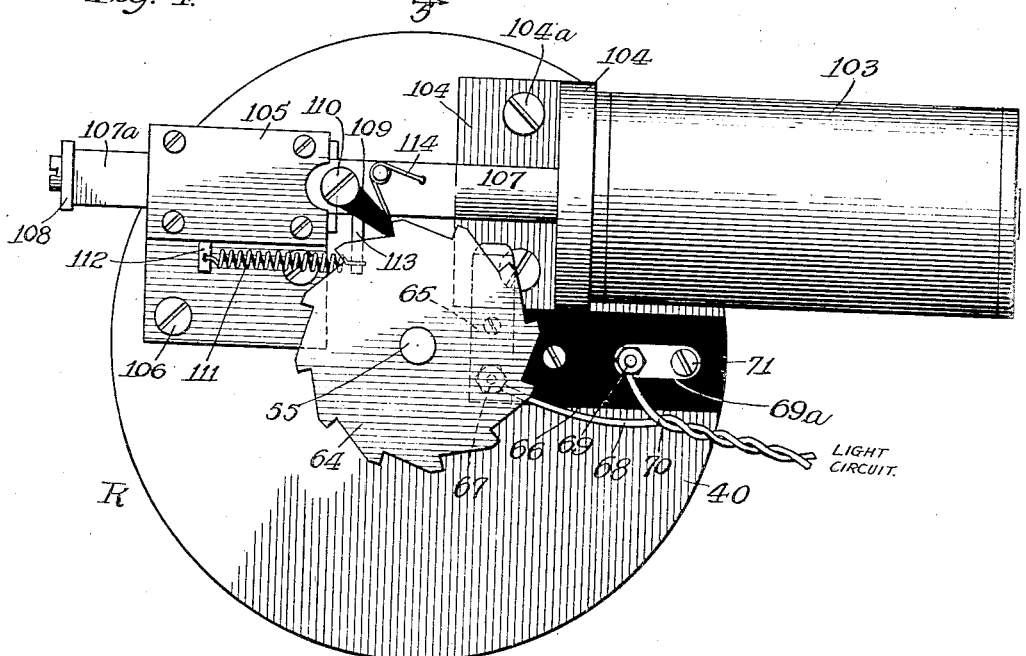

P. F. SPERY.
LIGHT VARYING APPARATUS FOR PRINTING MECHANISMS.
APPLICATION FILED MAY 21, 1914.

1,232,727.

Patented July 10, 1917.
4 SHEETS—SHEET 3.

Witnesses.
R. Burkhardt
C. H. Roessner

Inventor:
Philmon F. Spery
By Luther Johns, Atty.

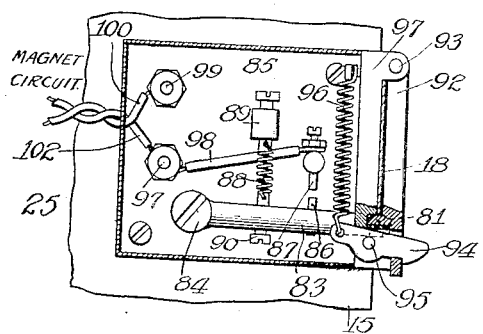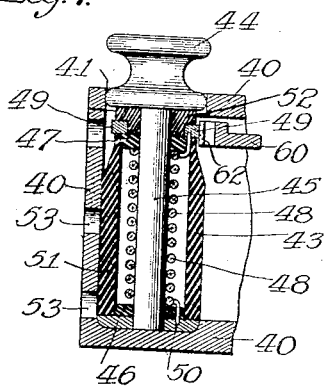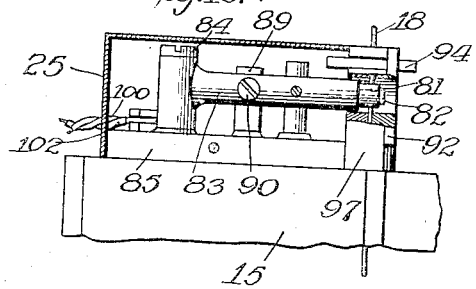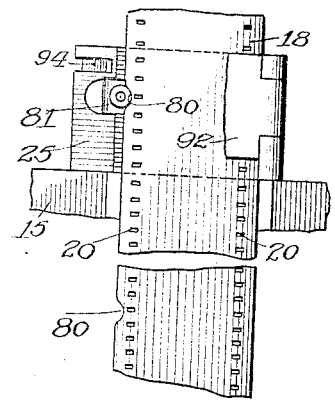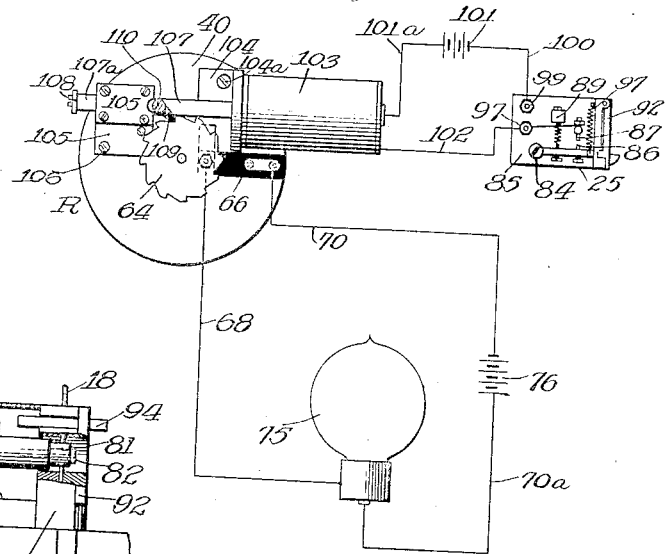

UNITED STATES PATENT OFFICE.

PHILMORE F. SPERY, OF CHICAGO, ILLINOIS, ASSIGNOR TO AMERICAN CINEMATOGRAPH COMPANY, OF CHICAGO, ILLINOIS, A CORPORATION OF ILLINOIS.

LIGHT-VARYING APPARATUS FOR PRINTING MECHANISMS.

1,232,727.   Specification of Letters Patent.   Patented July 10, 1917.

Application filed May 21, 1914. Serial No. 340,118.

*To all whom it may concern:*

Be it known that I, PHILMORE F. SPERY, a citizen of the United States, residing in Chicago, county of Cook, and State of Illinois, have invented certain new and useful Improvements in Light-Varying Apparatus for Printing Mechanisms, of which the following is a specification.

My invention relates to light-varying apparatus, and more particularly to means for varying the light in printing machines such as are employed, for instance, in duplicating motion picture films, although the invention may suitably be employed in other arts in which printing is done through long films or other strip-like negatives by means of light.

When motion picture films are exposed in the camera for picture taking it is almost invariably the case that, owing to the frequent variations in natural light conditions at a given place or to the differences between light conditions at the several locations where the pictures are being taken from time to time in the various scenes recorded by a single film, some portions of the film receive more light than others and the negative produced varies considerably in density from end to end. Should a positive be made from such a negative by printing with a constant light and such positive be used for projecting pictures upon a screen the varying density in the positive would produce a varying and unsatisfactory result in the pictures, some being very light and others quite dark, the variations being so great ordinarily, indeed, that many of the pictures would be practically indistinguishable. In order that the copies or positives made from the negative or master film may not be as unequal in density at various portions thereof as is the negative, hand-controlled means have been suggested with the object of regulating the artificial light projected upon the negative in the printing machine whereby the denser portions of the negative may receive more light than do the less dense portions thereof. The practice has been for an inspector to take a developed negative and examine it from end to end as to its density, marking on a piece of paper data indicating certain printing requirements, for instance, that the first 40 feet of the film will require a certain amount of light, that the next 60 feet must have another indicated quantity, and so on, whereupon the person who does the printing attempts to regulate the printing light by means including some hand operation such as bodily moving the lamp farther from or closer to the film. The means heretofore suggested, however, are not only laborious and exhaustive of valuable time, but are far from satisfactory for several other reasons, for instance that more or less guesswork is involved as to when the light must be changed as the film rapidly travels through the printing device, the time involved in shifting the lamp, and the uncertainty in determining just where the lamp should be positioned from time to time. Only the most constant and close attention by the operator yields results which are acceptable according to hitherto standards, and many prints are ruined by over and under printing at various places thereon. At the present time the demand for practically perfect positives is almost universal.

The objects of the present invention are, in general, to provide means whereby prints of a high degree of uniformity throughout may be made from strip-like films of varying light-transmitting density from end to end; whereby such results may be obtained at a high rate of production; whereby labor and expense are saved over heretofore suggested film-printing methods; whereby the production of defective positives may be substantially avoided; and whereby, in the automatic feature of the invention, in addition to the foregoing, all copies or reproductions of the master film may be substantially alike. More specific objects are to provide a film-printing device in which the printing light may be varied quickly and with certainty as to results, and also in accordance with the requirements of any particular film, by hand in certain arrangements and automatically in others; to provide such a device in which the source of light may be fixed and the light-producing current varied as desired: to provide a device in which the exercise of judgment or even attention on the part of the operator is not required after the printing operation is started in each case, and one in which human uncertainty is largely replaced by mechanical certainty in the printing operation. Other objects will hereinafter appear.

In the accompanying drawings, which form a part of this specification I have illustrated a preferred embodiment of my present invention in a form adapted for both automatic and hand operation of the light-varying device. It is to be understood that the light-controlling means illustrated, or modifications thereof within the scope of the appended claims, may be applied to film printing machines of various kinds, the one shown in the drawings being selected as a simple type, and in which certain parts such as trains of gears and belt-like driving means are shown conventionally for clearness of illustration.

In these drawings Figure 1 is a side elevation of a film-printing machine with my improved light-varying apparatus thereon, the lamp casing being partly broken away, the standard or support for the machine itself not being shown;

Fig. 3 is an enlarged top view of that portion of the light-varying apparatus which contains the resistance elements, the solenoid magnet for automatic operation, and also the hand lever which may be used;

Fig. 4 is a bottom view of the structure shown in Fig. 3;

Fig. 7 is a fragmentary vertical diametric section of one of the resistance elements and associated parts, as on the line 7—7 of Fig. 3;

Fig. 8 is a side elevation, partly in section and with the front wall removed, of a make-and-break contact device in association with the movable negative film;

Fig. 9 is a front view of the device shown in Fig. 8;

Fig. 10 is a bottom view, partly in section and with the bottom wall removed, of the device of Figs. 8 and 9; and Fig. 11 is a partly diagrammatic illustration showing the circuits, lamp, etc., of the light-varying device.

Figure 1:
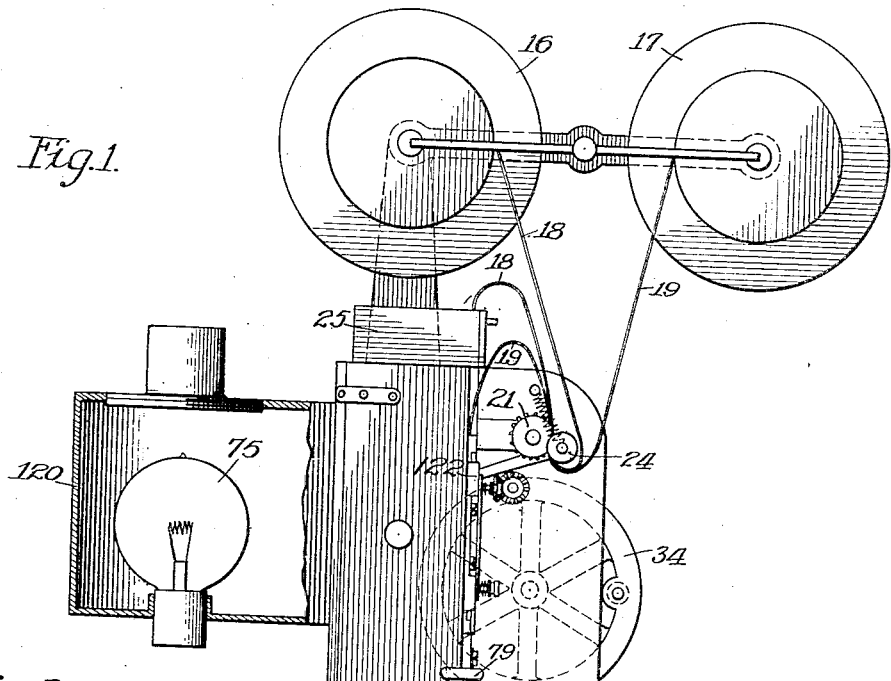

Rotatably mounted upon the printing machine 15 are two spools or reels 16 and 17 adapted to have wound thereon respectively the negative film 18 and the sensitized film 19 adapted to be printed and developed to form a positive. Each of these films is suitably provided with lateral openings 20 (Fig. 9) for the accommodation therein of means for causing the film to travel during the printing operation. Both films being punctured the same they are acted upon simultaneously by film-shifting devices such as the sprocket wheels 21 and 22 and the intermittent movement device 23. As will be noted from Figs. 1 and 2 the films pass simultaneously around a roller 24 and into mutual engagement with the sprocket 21, at which place they separate, the negative 18 passing through the tripping mechanism or make-and-break device 25, thereafter again meeting the film 19 and passing face to face with it through that part of the machine where the printing is done, that is, opposite the source of light 75, thence passing over the sprocket 22, held in proper position thereon by the roller 26, and thence away from the machine where the two films are wound upon separate spools, these latter not being shown. The sprockets 21 and 22 may be actuated by belts 27 and 28 passing over suitable sheave wheels 29, and the intermittent film-shifting device 23 may be operatively connected with the driving axle 31 by a suitable train of gears, conventionally shown and in dotted lines. The specific intermittent movement device 23 is fully described in my copending application for Letters Patent of the United States filed April 27, 1914 as Serial No. 834,603, to which reference is made and, as any suitable film-shifting mechanism may be employed, it will be sufficient here merely to mention that as the crank element 23$^a$ rotates, the film-engaging pins 23$^b$ move up and down, in the position shown, a cam (not shown) on the element 23$^a$ operating to move the pins 23 into and out of registering holes 20 of the two films here traveling face to face, simultaneously moving the films the desired distance with each up and down reciprocatory-like movement. A rotary shutter 32 geared to the driving wheel 33 permits light from the printing lamp to strike the film at the desired times. A hand wheel or lever 34 upon the driving shaft 31 constitutes one of several means which may be employed for operating the film-shifting and shutter means shown. As it is common in the art to shift the two films with portions thereof face to face during the printing operation and as mechanism for accomplishing the same is well known, a further description of the printing machine itself will not be necessary to a full understanding of the invention hereinafter more particularly described and claimed.

My present invention includes a lamp or source of light which may be relatively fixed with respect to the plane of movement of the films where the same are in printing position. It comprises, also, a lamp or source of light supplied by a light-producing fluid the current of which is susceptible of being varied. Such a current is naturally under pressure, whether it be an electric current or that of a gas, and if gas, variation either of the pressure or in the supply to the lamp by closing or opening the conduit thereto will result in varying the light emanating from the lamp. Where an electric lamp is employed, as in my preferred construction, the intensity of the light from the lamp may suitably be varied by a resistance device R in circuit with the lamp and a suitable source of electric current. Such variable resistance device may be of various forms, and, in the present construction illustrated it comprises a casing or frame 40, suitably in the form of a casting provided with a plurality of recesses 41 or suitable supports, as 42, adapted to hold in circular or arcuate arrangement the contact terminals of a plurality of resistance elements 43 of various resistances. I preferably employ twelve such resistance elements 43, as experience teaches that as many as twelve distinct degrees of density may be found in a single film. Each of these resistance elements suitably comprises a finger piece or head 44 (Fig. 7) having a centrally arranged stem 45, a pair of insulating washers 46 and 47, suitably of fiber, one or more coils of resistance wire 48, a metallic terminal 49 connected to one end of the resistance 48, a metallic terminal 50 connected to the other end of the resistance 48 and grounded in the frame 40 by contact therewith, and a suitable casing 51 of fiber or similar material. An insulating washer 52 maintains the terminal 49 from the head 44 and the stem 45. If the frame 40 be made with substantially solid walls as illustrated I preferably provide a plurality of openings 53 therein to permit radiation of heat from the resistance elements 43.

Figure 6:
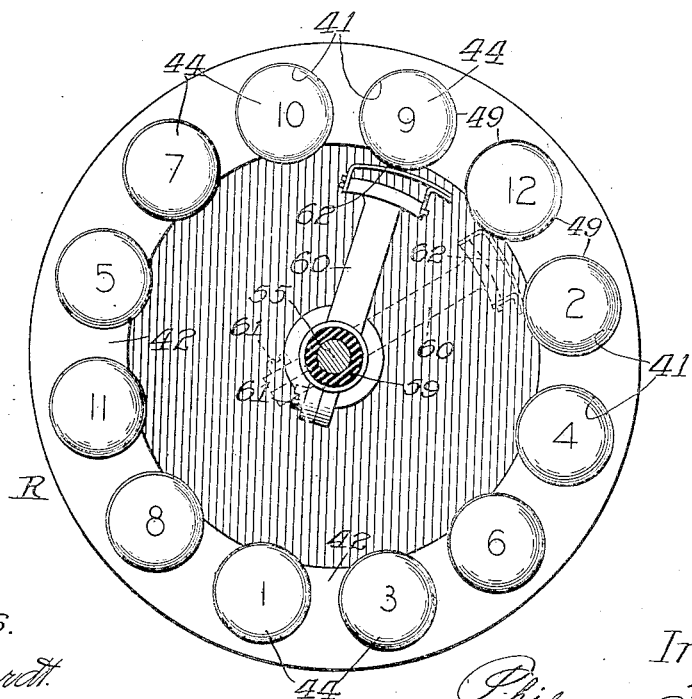
Fig. 6 is a horizontal section of the device shown in Fig. 3, as on the line 6—6 of Fig. 1.

Centrally of the circular line of resistance element terminals 49 a shaft 55 is rotatably mounted in the frame 40. A bushing 56 of insulating material, suitably fiber, acts as the bearing proper for this shaft, this bushing being held in position within the boss or projection 57, part of the frame 40. The frame 40 is suitably provided with a cover 58 in which is secured an insulating bushing 59 for the shaft 55. It will thus be seen that this shaft 55 is insulated electrically from the frame 40. An arm 60 is secured, as by the clamping or binding screw 61, upon a bare portion of the shaft 55, placing the shaft in electrical communication with this arm 60. At the outer end of the arm 60 is provided a spring contact brush 62 (Fig. 6) adapted to press against the respective terminals 49 of the resistance elements 43 as the shaft is axially turned, thus making an electrical connection between the shaft 55 and any one of the resistance elements 43 with which the brush 62 may be in contact. In Fig. 6 I have shown by dotted lines how the brush 62 remains in contact with one resistance element until actual contact is made with the next, by which arrangement the total loss of current for even an instant is avoided in the light circuit.

A ratchet wheel 64 is rigidly secured upon the shaft 55 and in electrical communication therewith, and a spring-like brush 65 contacts the ratchet 64 at all times, this brush 65 being mounted upon an insulating block 66, suitably of fiber, which, in turn is rigidly secured to the frame 40, a binding post 67 providing means for making an electrical connection with the brush 65 through the conductor 68. Upon the insulating block 66 is also secured a binding post 69 to which the conductor 70 is secured, as by a nut in the usual way. This binding post 69 is in electrical communication by means of the plate 69$^a$ with the screw 71, this screw being threaded into and therefore electrically grounded in the frame 40. It will thus be seen that an electrical circuit is formed from the conductor 68 through the spring 65, ratchet 64, shaft 55, arm 60, brush 62, any one of the terminals 49 and its coil of resistance wire 48, frame 40, terminal 69, and conductor 70.

From Fig. 11 it will be seen that the electric lamp 75 and source of electric current 76 are in circuit with the variable resistance device R through the conductors 68, 70 and 70$^a$, and that rotative movement of the shaft 55 will vary the current supplied to the lamp 75 by successively placing greater or less resistance in the circuit by causing the current to flow successively through one and another of the resistance elements 43.

The resistance elements 43 are so loosely positioned in the recesses 41 of the frame 40 that they may be placed therein or lifted therefrom by the hand of the operator at will. It will be noted from Figs. 3 and 6 that each element 43 carries a designating character, as a serial number, ranging, in the device shown, from 1 to 12 inclusive. These numbers indicate the relative resistances of the several elements, such resistance gradually increasing from relatively low in number 1 to relatively high in number 12. The resistance elements may be arranged in the frame 40 in an unbroken and natural sequence, as from 1 to 12, which arrangement is preferable when the device is operated by hand. For such hand operation a lever 77 having a pointer 78 and handle 79 is rigidly mounted upon the shaft 55. This handle 79 is under the easy control of the operator, and when operating by hand he merely swings the lever from time to time so that the pointer 78 indicates the element having the desired amount of resistance, the contact brush 62 being in the same vertical plane with the pointer when in operative position contacts the terminal 49 of the same element 43.

Figure 2:
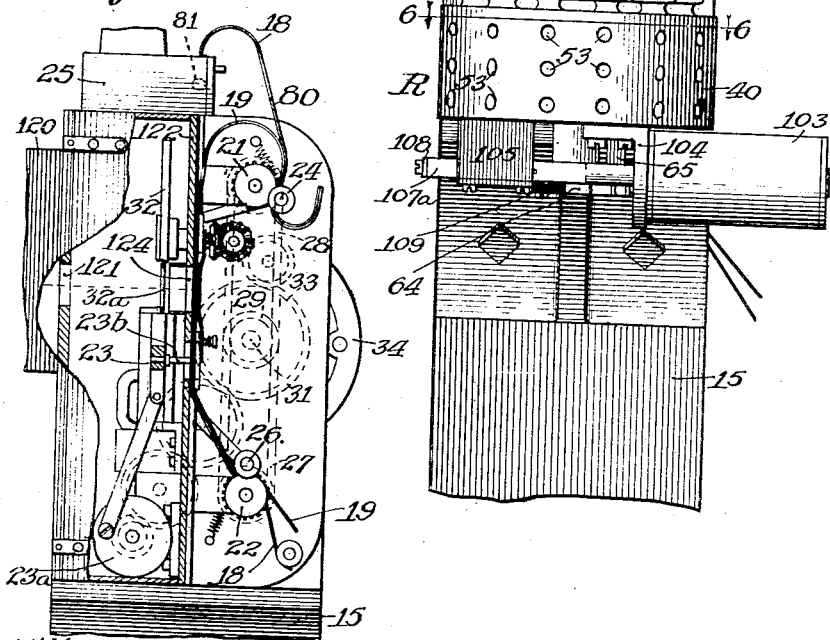
Fig. 2 is an enlarged fragment, partly in section and partly broken away, showing a suitable form of film-shifting device and shutter, and means for operating the same.

The automatic light-varying feature of the invention comprises means adapted to coöperate thereto preferably with one of the movable films, the film having suitable provisions therefor. Broadly, it comprises a tripping device and means preferably on the film for actuating the same. In the specific construction and arrangement illustrated the means or provisions on the film for this purpose are a plurality of notches or recesses, or a single notch or recess, in an edge portion of the film. In Fig. 9 I have shown such notch or recess 80 as arcuate in shape, suitable for the accommodation therein of the friction roller 81 secured rotatably, as by means of the axially positioned screw 82, at the end of an arm 83 mounted to have movement by being pivoted, as by the bolt or pin 84 to a relatively fixed part, as to the base 85 of the device 25, which base 85 is secured, as shown in Fig. 1, to the frame of the printing machine. For axially turning the shaft 55 for automatic work I preferably employ electrical means, and the film-engaging element 83 is suitably provided with a contact point 86 adapted to engage the contact point 87 when the roller 81 enters one of the recesses 80, as shown in the upper portion of Fig. 9. An adjustable spring 88 between a fixed projection 89 on the base 85 and the screw 90 on the arm 83 holds the roller 81 against the negative film 18 and draws it into the recesses 80 as the film travels. Only the negative film is thus notched or recessed, and by reference to Fig. 1 it will be seen that only the negative film passes through the tripping or make-and-break device 25. The film 18 is suitably maintained in proper relation with the roller 81 by a door-like plate or cover 92 hinged as at 93 and held by an operative catch 94, pivoted at 95 and maintained in locking position by the spring 96, this door-like cover 92 and the frame part 97 being formed to provide a suitable channel for the film.

By reference to Fig. 8 it will be observed that the contact 87 is in electrical communication with the binding post 97 by a conductor 98, this binding post 97 being insulated from the base 85. The binding post 99 is grounded in the base 85. As shown in Fig. 11, the conductor 100 connected with the binding post 99 leads to a source of electric current 101, and the conductor 102 connected with the binding post 97 is connected with one end of the winding of a magnet, suitably a solenoid 103, preferably rigidly secured to the frame 40 of the resistance device R, as by means of the bracket 104 and screws, as 104ᵃ. The conductor 101ᵃ is connected with the other end of the solenoid winding, thus completing a circuit through the solenoid which is made and broken electrically by the contact points 86 and 87, the screw or pin 84 being an electrical connection grounded in the base 85.

Figure 5:
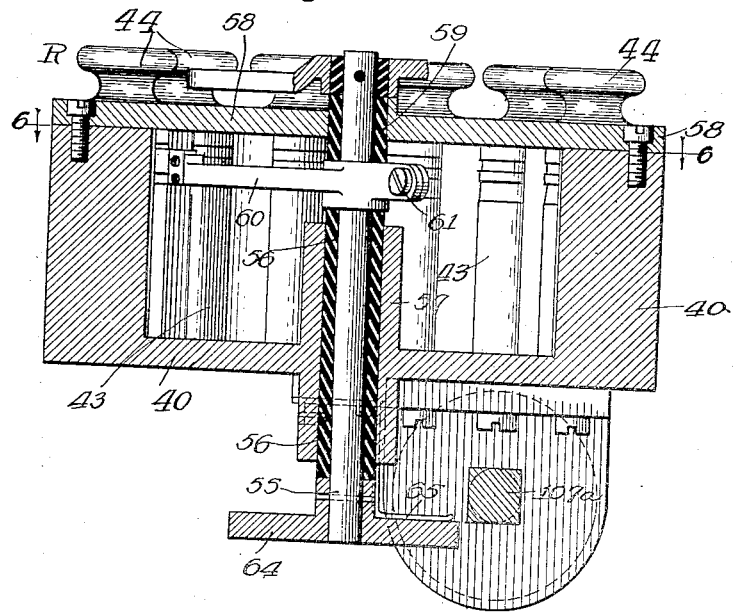
Fig. 5 is a vertical diametric section of the same structure, as on the line 5—5 of Fig. 3.

Also upon the frame 40 a bracket-like support 105 is secured as by screws 106 permitting reciprocation therein of the armature 107 of the magnet 103, this armature suitably being given a shape where it reciprocates in the guide block 105 whereby an axially rocking movement thereof is prevented, such shape being suitably square as shown at 107ᵃ of Fig. 5. A stop 108 on the portion 107ᵃ and adapted to contact the support and guide 105 prevents the armature from being actuated by the magnet beyond the desired distance or stroke. A pawl 109 is mounted upon the armature 107, as by a screw or bolt 110, and arranged to engage successively the teeth of the ratchet 64. The pawl 109 is insulated from the armature to prevent the current for the lamp from being short-circuited at this point, and may suitably be made of hard rubber or fiber, or in any other good mechanical way which provides suitable insulation between the ratchet and the armature when the parts are operatively together.

It will now be readily understood that as the negative or master film travels through the tripping or make-and-break device 25, and with the roller 81 pressing against the edge of the film, the arrival of one of the notches 80 at the roller 81 will permit the roller to be moved more toward the center line of the film, thereby causing the contact points 86 and 87 to come together for a very brief interval of time, but sufficiently long to energize the magnet 103 causing more of the armature 107 to move into the magnetic field and causing the pawl 109 to turn the ratchet wheel 64 the arcuate distance represented by one notch thereof, thereby moving the contact spring 62 from one resistance element 43 to the next. The magnet circuit being broken by the movement of the film in carrying the recessed portion at 80 out of association with the roller 81, the armature is retracted by the spring 111 having one end secured to a projection 112 from the support 105 and the other end to a stud 113 upon the armature. The pawl 109 is suitably maintained in contact with the ratchet 64 by a spring element 114.

The operation of the machine when the automatic feature is employed calls for the examination of the film by an inspector who, from his knowledge of the various degrees of intensity of light produced by the lamp 75 when the various resistance elements, as from one to twelve, are respectively in circuit with the lamp, marks on a piece of paper numerals indicating the order or sequence in which the resistance elements should be employed as changes in light are required. Thus, according to the resistance-designating numbers shown in Figs. 3 and 6, the first portion of the film will require a resistance designated as No. 9, the next change will be to No. 12, the next to No. 2, then 4, then 6, etc. At the same time, by means of a knife, pair of scissors or preferably a specially adapted punch he cuts one of the recesses 80 in the side of the film, and makes such a recess therein as often as the film changes appreciably in density. By reference to Fig. 2 it will be observed that some distance is shown between the roller of the tripper or make-and-break device 25 and the place where the printing is done, that is, on a horizontal line with the lamp 75. The inspector knows what this exact distance is, either by the number of pictures on the negative between the two points or according to a measuring stick or rule. It is desired, of course, to change the intensity of the light exactly at the time a series of less dense or more dense pictures begins its printing operation. The inspector therefore notches the film so that when the first picture of the series requiring additional or less light has come substantially into its exact printing position and just before the shutter 35 opens for printing light the notched portion of the film coöperating to make the change is at the roller 81. The person doing the printing then takes the film and the inspector's data showing, for instance, the series of numbers 9, 12, 2, 4, 6, etc., and from a supply of the resistance elements 43 selects and arranges these elements in the frame 40 in the sequence shown. I preferably provide several resistance elements of each number in a suitable rack or frame so that should the same amount of resistance be required at several places in the film the frame 40 may be charged with duplicates as required. The operator is thus entirely relieved of attention to the machine after the printing operation is started, and one operator may thus keep five or six machines in operation printing films, whereas heretofore one operator is required for each machine. Furthermore, by the use of the automatic feature one master film may be duplicated as often as required and all of the copies will be substantially or exactly alike, and, as particularly desired, they are substantially uniform from end to end. The importance of the high rate of reproduction of positives from a single master film will be readily appreciated also by persons acquainted with the present demands of the art.

As these film printing machines are operated in a dark room it is not necessary to incase the sensitized film, and the only white light it normally receives during the printing operation is from the lamp 75, which lamp is suitably incased by the light-proof housing 120 on five sides thereof, the front wall having a suitable opening 121 in line with the source of light and the opening in the shutter when the shutter opening 32ª is opposite the place where the films are in printing position, the wall 122 of the printing machine having an opening 124 registering with the opening in the shutter and the opening in the front wall of the casing 120.

The invention is not limited to the specific form of construction of the device shown as various practical embodiments of the invention may be made, resulting not only from changes in these specific features of construction and arrangement, but also in the employment of equivalent or substitute means which, from the present teaching, may be adapted to accomplish the desired results, all within the spirit of the disclosure made. The appended claims will indicate the scope of the invention, and all changes, variations, modifications or substitutions are contemplated by me as fall within the scope of these claims.

I claim:

1. In a film printing machine, the combination of a master film notched at various places at edge portions thereof, a source of electric light, means for causing the film to travel in the path of light from said source, a plurality of resistance elements in arcuate arrangement, a movable contact piece in said light circuit, said contact piece being mounted and arranged to contact said resistance elements one after the other in a step-by-step movement, each of said resistance elements having contact with said light circuit whereby said light circuit is complete through said contact piece and any one of said resistance elements with which it may be in contact, and means operated by the notched portions of said master film for moving said contact piece progressively into contact with said resistance elements.

2. In a film-printing machine, the combination of a master film, a source of electric light, means for moving said film in the path of light from said source, a support for holding resistance elements in arcuate arrangement, each of said resistance elements being in electric communication with said light circuit, a contact piece also in electric communication with said light circuit, said contact piece being arranged and adapted to move into contact progressively with one after the other of said resistance elements whereby said light circuit is complete through any one of said resistance elements with which said contact piece may be in contact, and means under the control of said master film for moving said contact piece step-by-step into contact with said several resistance elements.

3. A light-varying device for film printing machines comprising in combination a light circuit, a plurality of resistance elements, each of a predetermined resistance, a holder for said resistance elements, said holder and said resistance elements being so formed that said resistance elements may be arranged in said holder in any predetermined order, each of said resistance elements, when positioned in said holder, being in electric communication with said light circuit, a movable contact piece also in electric communication with said light circuit and adapted to move progressively into contact with said several resistance elements whereby the light circuit is complete through any one of said resistance elements with which said contact piece may be in contact, and means for progressively moving said contact piece into contact with said resistance elements.

4. In a film printing machine, the combination of a source of electric light, a master film, means for moving the film in the path of light from said source, a plurality of resistance elements in electric communication with the light circuit, a movable contact piece adapted to contact progressively said resistance elements, said contact piece being in said light circuit, a magnet actuated by a secondary circuit, means associated with said magnet for moving said contact piece progressively into contact with said several resistance elements, and means under the control of said master film for actuating said magnet at predetermined intervals.

PHILMORE F. SPERY.

Witnesses:
 LUTHER JOHNS,
 T. D. BUTLER.